(12) United States Patent
Labocki et al.

(10) Patent No.: US 9,940,111 B2
(45) Date of Patent: Apr. 10, 2018

(54) POLICY-BASED APPLICATION DEPLOYMENT TO A TARGET APPLICATION PLATFORM SYSTEM

(71) Applicant: Red Hat, Inc., Raleigh, NC (US)

(72) Inventors: James Labocki, Dunedin, FL (US); Matthew Hicks, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 21 days.

(21) Appl. No.: 14/132,590

(22) Filed: Dec. 18, 2013

(65) Prior Publication Data
US 2015/0169306 A1 Jun. 18, 2015

(51) Int. Cl.
| | |
|---|---|
| *G06F 9/445* | (2018.01) |
| *H04L 29/08* | (2006.01) |
| *G06F 9/455* | (2018.01) |
| *G06F 9/45* | (2006.01) |

(52) U.S. Cl.
CPC .................. *G06F 8/60* (2013.01); *G06F 8/40* (2013.01); *G06F 9/45533* (2013.01); *H04L 67/10* (2013.01); *H04L 67/2809* (2013.01); *H04L 67/2823* (2013.01)

(58) Field of Classification Search
None
See application file for complete search history.

(56) References Cited

U.S. PATENT DOCUMENTS

| | | | |
|---|---|---|---|
| 8,478,845 B2 | 7/2013 | Agarwala et al. | |
| 8,997,082 B1* | 3/2015 | Bacus | G06F 17/2288 717/169 |
| 2003/0145316 A1* | 7/2003 | McKinlay et al. | 717/173 |
| 2005/0256892 A1* | 11/2005 | Harken | G06F 17/303 |
| 2006/0059253 A1* | 3/2006 | Goodman | G06Q 10/10 709/223 |
| 2006/0242241 A1* | 10/2006 | Tock | H04L 63/083 709/206 |
| 2007/0300215 A1* | 12/2007 | Bardsley | G06F 8/65 717/168 |
| 2008/0059969 A1* | 3/2008 | Johnson | G06F 9/5016 718/104 |
| 2008/0301231 A1* | 12/2008 | Mehta | G06F 8/61 709/204 |

(Continued)

OTHER PUBLICATIONS

Definition for "translate", Dictionary.com, Sep. 8, 2012.*
(Continued)

*Primary Examiner* — Daxin Wu
(74) *Attorney, Agent, or Firm* — Lowenstein Sandler LLP

(57) ABSTRACT

Implementations for policy-based application deployment and continuous best-fit placement across heterogeneous computing infrastructures are disclosed. A method of the disclosure includes determining that an application of a source application platform system triggered a metrics-based threshold of a plurality of metrics-based thresholds, determining, based on the metrics-based threshold that was triggered, a target application platform system to deploy the application, translating metadata of the application from a format of the source application platform system to a format of the target application platform system, and causing the application to be deployed at the target application platform system.

20 Claims, 4 Drawing Sheets

(56) References Cited

U.S. PATENT DOCUMENTS

| | | | | |
|---|---|---|---|---|
| 2010/0077449 | A1* | 3/2010 | Kwok | G06F 9/5027 726/3 |
| 2010/0287263 | A1* | 11/2010 | Liu et al. | 709/221 |
| 2010/0306356 | A1* | 12/2010 | Gao | G06F 8/60 709/222 |
| 2012/0036245 | A1* | 2/2012 | Dare | G06F 8/60 709/223 |
| 2012/0036494 | A1* | 2/2012 | Gurumohan et al. | 717/106 |
| 2012/0151061 | A1 | 6/2012 | Bartfai-Walcott et al. | |
| 2012/0180058 | A1* | 7/2012 | Barsness | G06F 9/5066 718/102 |
| 2012/0239739 | A1* | 9/2012 | Manglik | G06F 9/5077 709/203 |
| 2012/0266156 | A1* | 10/2012 | Spivak | G06F 9/5055 717/172 |
| 2012/0291021 | A1* | 11/2012 | Banerjee | G06F 8/665 717/173 |
| 2012/0324069 | A1 | 12/2012 | Nori et al. | |
| 2013/0007088 | A1 | 1/2013 | Alfredo et al. | |
| 2013/0013377 | A1 | 1/2013 | Kruglick | |
| 2013/0067448 | A1* | 3/2013 | Sannidhanam | G06F 8/60 717/169 |
| 2013/0185712 | A1* | 7/2013 | Osada | G06F 8/61 717/174 |
| 2013/0191528 | A1* | 7/2013 | Heninger et al. | 709/224 |
| 2013/0254041 | A1* | 9/2013 | Sherwin | G06Q 30/02 705/14.68 |
| 2013/0290960 | A1* | 10/2013 | Astete | G06F 9/45533 718/1 |
| 2013/0326189 | A1* | 12/2013 | Cilibrasi | G06F 9/4401 711/208 |
| 2014/0006626 | A1* | 1/2014 | Breiter | H04L 41/0806 709/226 |
| 2014/0019951 | A1* | 1/2014 | Petrova | G06F 9/4448 717/169 |
| 2014/0068546 | A1* | 3/2014 | Balasubramanian | G06F 8/61 717/104 |
| 2014/0068591 | A1* | 3/2014 | Harding | G06F 8/65 717/171 |
| 2014/0096186 | A1* | 4/2014 | Barton | H04L 67/10 726/1 |
| 2014/0130036 | A1* | 5/2014 | Gurikar | G06F 8/61 717/176 |
| 2014/0136605 | A1* | 5/2014 | Gropper | G06Q 30/02 709/203 |
| 2014/0189680 | A1* | 7/2014 | Kripalani | 717/176 |
| 2014/0282525 | A1* | 9/2014 | Sapuram | G06Q 30/0631 718/1 |
| 2015/0051937 | A1* | 2/2015 | Verkindt | G06Q 10/06 705/7.23 |
| 2015/0113516 | A1* | 4/2015 | Bennah | G06F 8/65 717/170 |
| 2015/0199197 | A1* | 7/2015 | Maes | G06F 8/71 717/122 |

OTHER PUBLICATIONS

Definition for "metadata", Dictionary.com, year 2012.*
Definition for "format", Dictionary.com, Nov. 26, 2012.*
Paraiso, et al; A Federated Multi-Cloud PaaS Infrastructure; Cloud Computing (CLOUD), 2012 IEEE 5th International Conference; Jun. 24-29, 2012; http://ieeexplore.ieee.org/xpl/login.jsp?tp=&arnumber=6253530&url=http%3A%2F%2Fieeexplore.ieee.org%2Fxpls%2Fabs_all.jsp%3Farnumber%3D6253530; 2 pgs.
Schuller, Sinclair; Will Being a Successful App Server Vendor Translate to Java PaaS Success?; Jul. 1, 2013; http://apprenda.com/blog/will-being-a-successful-app-server-vendor-translate-to-java-paas-success/; 3 pgs.
The Effect of PaaS on Cloud Delivery Models; http://dustinamrhein.wordpress.com/tag/cloud-computing/; Dustin's Blog; Jul. 7, 2010; 7 pgs.
Demchenko, et al; Defining Inter-Cloud Architecture for Interoperability and Integration; Cloud Computing 2012: The Third International Conference on Cloud Computing, GRIDs, and Virtualization; 7 pgs.
Buyya, et al; InterCloud: Utility-Oriented Federation of Cloud Computing Environments for Scaling of Application Services; Springer Link; 2010; 5 pgs.

* cited by examiner

POLICY-BASED APPLICATION DEPLOYMENT TO A TARGET APPLICATION PLATFORM SYSTEM

TECHNICAL FIELD

The implementations of the disclosure relate generally to computing infrastructures and, more specifically, relate to policy-based application deployment and continuous best-fit placement across heterogeneous computing infrastructures.

BACKGROUND

The advent of cloud computing has led to many new lifecycle management methods for applications deployed using cloud computing infrastructures. These new lifecycle management methods drastically reduce the time required to build and update applications. This reduction in time required to build and update applications has led to increased organizational agility and a reduction in cost.

However, the ability to migrate workloads from these new lifecycle management methods to traditional lifecycle management methods and between new lifecycle management methods is limited. This ability to quickly choose the lifecycle management method appropriate for the computing model is critical to maintaining flexibility. Flexibility is strategic to information technology (IT) organizations for several reasons including compliance and deployment restrictions.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the disclosure provide for policy-based application deployment and continuous best-fit placement across heterogeneous computing infrastructures. The advent of cloud computing has led to many new lifecycle management methods for applications deployed using cloud-computing infrastructures. These new lifecycle management methods drastically reduce the time required to build and update applications. However, the ability to migrate workloads from these new lifecycle management methods to traditional lifecycle management methods and between new lifecycle management methods is limited. This ability to quickly choose the lifecycle management method appropriate for the computing model is critical to maintaining flexibility. Flexibility is strategic to information technology (IT) organizations for several reasons including compliance and deployment restrictions.

In one implementation a management system is provided to translate an application from one application platform infrastructure to a different application platform infrastructure. The management system may monitor statistics of the application to determine whether a policy-based threshold has been triggered (i.e., based on performance metrics, security metrics, cost metrics, location metrics, etc.). Based on the triggered policy-based threshold, the management system determines the type of application platform infrastructure to transfer the application. The management system then translates, using a rules engine, metadata of the application to a format consistent with the target application platform infrastructure. The management system can then cause the application to be deployed on the target application platform infrastructure. The automated deployment and understanding of the application platform infrastructure as a service description makes for faster and less error prone deployment.

Figure 1:
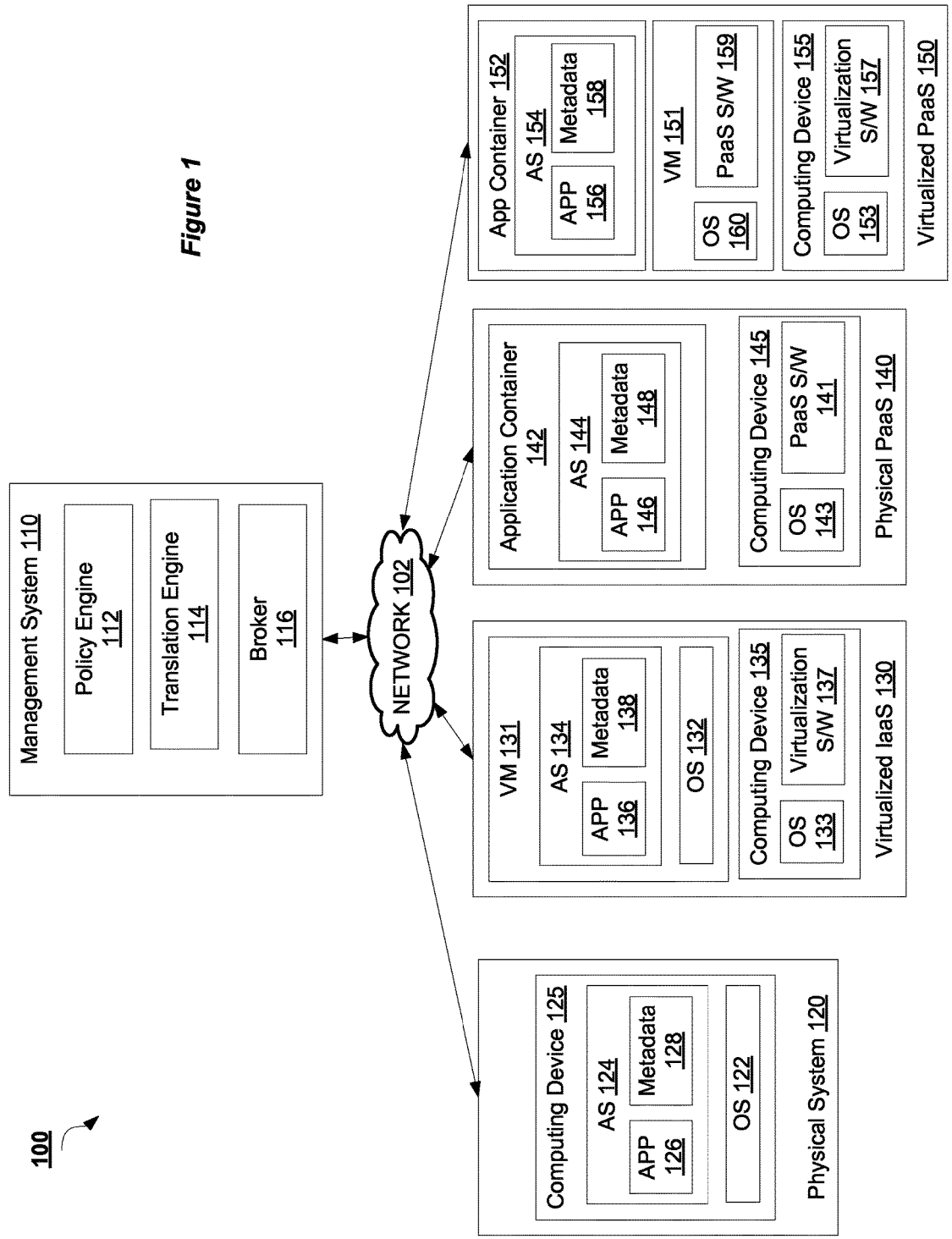
FIG. 1 is a block diagram of a network architecture in which implementations of the disclosure may operate.

FIG. 1 is a block diagram of a network architecture 100 in which implementations of the disclosure may operate. The network architecture 100 includes a management system 110 communicably coupled to one or more application platform systems 120-150 via network 102. Network 102 may be a private network (e.g., a local area network (LAN), a wide area network (WAN), intranet, or other similar private networks) or a public network (e.g., the Internet). Management system 110 may include one or more machines such as server computers, desktop computers, or any other computing device.

Application platform systems 120-150 are computing infrastructures that provide resources (physical and/or virtual) and services to deploy one or more applications 126, 136, 146, 156. One type of application platform system is a physical system 120. Physical system 120 may include a computing device 125 hosting an operating system (OS) 122 that executes an application server (AS) 124 hosting application 126. Computing device 125 may be a server computer, desktop computer, or any other computing device. Metadata 128 corresponding to the AS 124 and the application 126 may also be included in AS 124. Metadata 128 may include the characteristics and configurations of the AS 124 and of the application 126. For example, metadata 128 may include a runtime environment of the application 126, properties used for scaling the application 126, backup requirements of the AS 124 and of the application 126, and so on.

Another type of application platform system is a virtualized Infrastructure-as-a-System (IaaS) platform 130, which utilizes virtual machines (VMs) to host and deploy applications 136. Virtualized IaaS 130 may include a computing device 135 hosting an OS 133 and virtualization software 137. The virtualization software 137 may virtualize the resources of computing device 135 to provide one or more VMs 131 running on computing device 135. Computing device 135 may be a server computer, desktop computer, or any other computing device. Each VM 131 may host another OS 132 which runs an AS 134 hosting one or more applications 136 and associated metadata 138.

An additional type of application platform system is a physical Platform-as-a-Service (PaaS) platform 140, which utilizes application containers 142 as execution spaces for applications 146. An application container 142 includes a resource-constrained processing space of a computing device 145. The computing device 145 of the physical PaaS 140 may include an OS 143 and PaaS software 141. Computing device 145 may be a server computer, desktop computer, or any other computing device. PaaS software 141 may implement and manage the applications containers 142, as well as control initialization of the various applications 146 utilizing the physical PaaS platform 140. Each computing device 145 in a physical PaaS 140 may host multiple applications containers 142, each running an application 146. In some embodiments, application container 142 may run an AS 144 that hosts the applications 146 and associated metadata 148.

A further type of application platform system is a virtualized PaaS platform 150, which utilizes applications containers 152 running on VMs 151 to host applications 156. Each VM 151 may execute multiple application containers 152. The application containers 152 are resource-constrained processing spaces of the VM 152. The VMs 151 may be hosted by one or more computing devices 155 of the virtual PaaS 150. The VMs 151 may include an OS 160 and PaaS software 159. PaaS software 159 may implement and manage the VMs 151 and applications containers 152, as well as control initialization of the various applications 156 utilizing the virtual PaaS platform 150. VMs 151 may execute on a computing device 155, which may be a server computer, desktop computer, or any other computing device. Each computing device 155 in a virtual PaaS 150 may include an OS 153 and virtualization software 157 to host multiple VMs 151. The VMs 151, in turn, may each host multiple applications containers 152 that each run an application 156. In some embodiments, application container 152 may run an AS 154 that hosts the applications 156 and associated metadata 158.

Other types of application platform systems 120-150 than those specifically illustrated and described above may also be implemented in embodiments of the disclosure. In some embodiments, one or more of the application platform systems 120-150 may interact with and utilize a cloud computing system (not shown) managed by a cloud provider system. The cloud provider system provides nodes to execute software and/or other processes. In some implementations, these nodes are virtual machines (VMs) hosted in the cloud computing system. Each VM is hosted on a physical machine configured as part of the cloud computing system. The VMs may be executed by OSes on each host machine.

Users can interact with applications executing on the cloud-based VMs using client computer systems via a variety of internet protocols. These include, but are not limited to, web-based protocols, such as HyperText Transfer Protocol (HTTP) and HyperText Transfer Protocol Secure (HTTPS), but also could involve messaging protocols, such as Advanced Messaging Queuing Protocol (AMQP), Streaming Text Oriented Messaging Protocol (STOMP), and MQ Telemetry Transport (MQTT), or data access protocols such as Java Database Connectivity (JDBC). Users may also be able to securely interact with the application container itself using protocols such as Secure Shell (SSH). A client computing system may be a mobile device, a PDA, a laptop, a desktop computer, a tablet computing device, a server device, or any other computing device. In other implementations, the applications may be hosted directly on host machines without the use of VMs (e.g., a "bare metal" implementation), and in such an implementation, the hosts themselves are referred to as "nodes".

In one embodiment, the application platform systems 120-150 are communicably coupled to a management system 110 via network 102. Management system 110 may be part of an organization providing the application platform systems 120-150 or may be communicate with other organizations providing one or more of the application platform systems 120-150. Management system 110 may provide continuous best-fit placement of an application 126, 136, 146, 156 across the different application platform systems 120-150 based on policies implemented by the management system 110. As discussed above, management system 110 may be implemented on one or more machines, such as server computers, desktop computers, or any other computing device.

The management system 110 of embodiments of the disclosure can translate an application, such as applications 126, 136, 146, 156, from one source application platform system 120-150 to a different target application platform system 120-150. For example, management system 110 may oversee and manage the translation of the application 156 running on the virtual PaaS 150 to an application 136 running on the virtual IaaS 130.

Management system 110 may include a policy engine 112, a translation engine 114, and a broker 116. The broker 116, in cooperation with policy engine 112, may monitor the status of applications 126, 136, 146, 156 as well as their corresponding containers and, potentially, computing devices and other external systems, such as third-party monitoring systems to determine whether a policy-based threshold has been triggered (i.e., based on a performance metrics threshold, security metrics threshold, cost metrics threshold, location metrics threshold, etc.). Based on the triggering event, the broker 116, in cooperation with policy engine 112, determines a type of application platform system 120-150 to transfer the application 126, 136, 146, 156. The translation engine 114 then translates metadata 128, 138, 148, 158 of the application 126, 136, 146, 156 to a metadata format consistent with the target application platform system 120-150. The broker 116 may then cause the application 126, 136, 146, 156 to be deployed on the target application platform system 120-150. Further details of management system 110, and its components, are described below with respect to FIG. 2.

Figure 2:
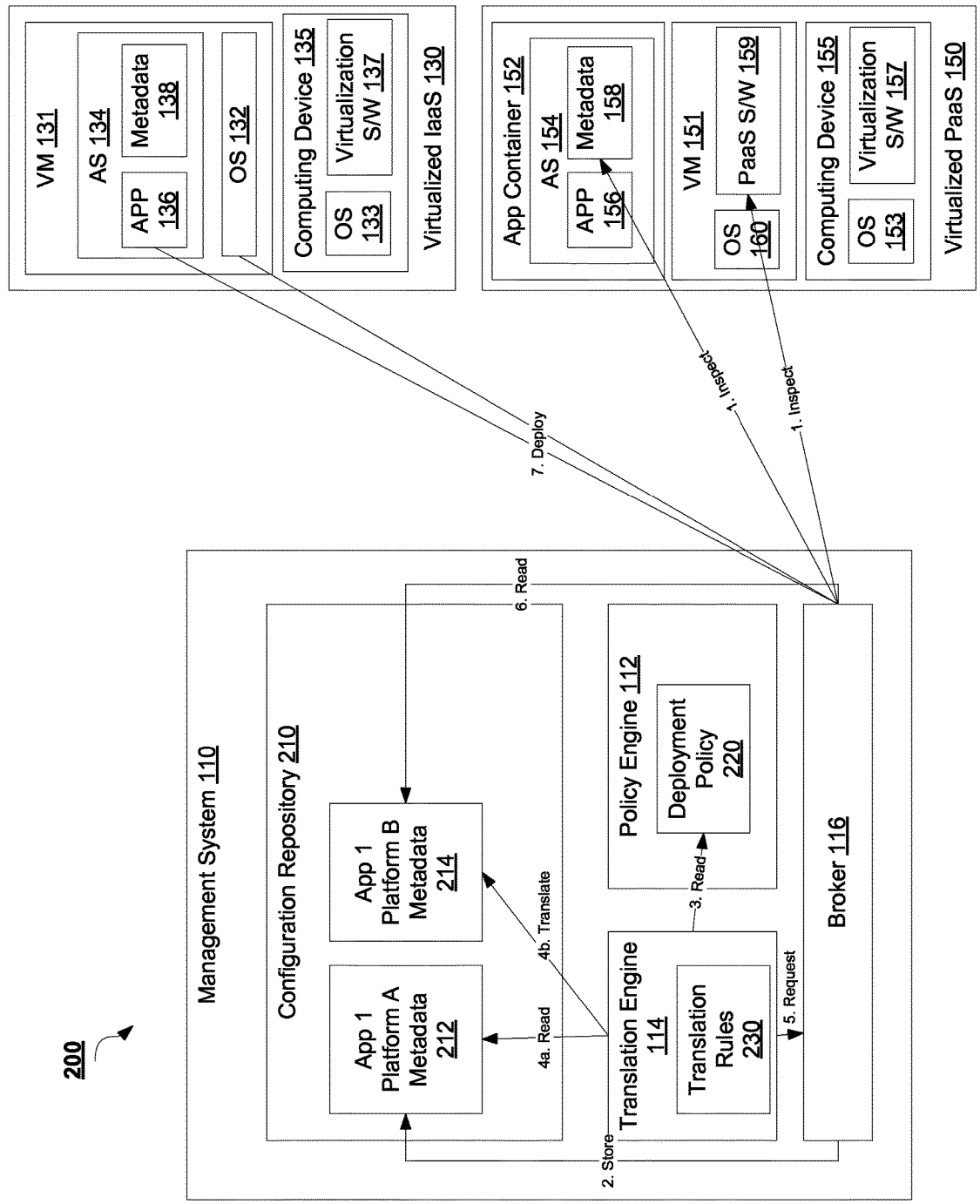
FIG. 2 is a block diagram of management system infrastructure according to an implementation of the disclosure.

FIG. 2 is a block diagram of management system infrastructure 200 according to an implementation of the disclosure. The management system infrastructure 200 provides continuous best-fit placement of an application across different application platform systems based on policies implemented by the management system. Management system infrastructure 220 may include management system 110, described with respect to FIG. 1. The management system 110 may communicate with one or more application platform systems, such as virtualized IaaS 130 and virtualized PaaS 150 of FIG. 1. Although not specifically illustrated, management system 110 and application platform systems may be communicably coupled via a network.

In one implementation, the management system 110 is one or more computing devices, and includes a policy engine 112, translation engine 114, broker 116, and configuration repository 210. Management system 110 may include more or less components than illustrated and described. As discussed above, management system 110 provides continuous best-fit placement of an application across different application platform systems based on policies implemented by the management system. The management system 110 can translate an application from one source application platform system to a different target application platform system. For example, management system 110 may oversee and manage the translation of the application 156 running on the virtual PaaS 150 to an application 136 running on the virtual IaaS 130.

Broker 116 may be a component implemented in hardware, software, firmware, or any combination of the above, that can interface with application programming interfaces (APIs) of each of the application platform systems, such as APIs of virtualized IaaS 130 or APIs of virtualized PaaS 150, in order to interact with and deploy applications on the corresponding application platform systems. For example, broker 116 understands the commands and provisioning requirements of each application platform system it is connected to, and can communicate with these application platform systems to provision resources and deploy applications.

In one embodiment, broker 116 monitors and inspects (as shown in FIG. 2 as "1. Inspect") running applications on one or more application platform systems to determine whether a status of any of the applications triggers a translation event. In one embodiment, broker 116 monitors applications running on a single application platform system, with the ability to transfer the application to one of multiple different application platform systems than the monitored application platform system. For example, assume for purposes of the following description, that broker 116 monitors applications running on virtualized PaaS 150, such as application 156. The broker 116 may utilize a set interval (polling) or a stateful API (if provided by the PaaS software or Virtualization software) or a publish/subscribe message bus model to monitor and inspect applications 156.

Broker 116 may reference policy engine 112, and specifically a deployment policy 220 maintained by policy engine 112, to determine when metrics exhibited by the application 156 trigger a translation threshold for another application platform system. The metrics may be performance-based, security-based, location-based, cost-based, and so on. For example, a performance-based metric may include a demand threshold (e.g., when a number or rate of requests to the application passes a certain amount, migrate the application to a different application platform system). A cost-based metric may include a monetary expense threshold for resources of the application platform system (e.g., when a spend on resources for the application passes a certain amount, migrate the application to a different application platform system). A security-based metric may include a threshold of occurrences of security events or governance requirements before an application is migrated to a more secure application platform system (e.g., physical hardware). A location-based metric may include a threshold amount of data being handled in a particular location (e.g., specific country) before the application is moved to an application platform system in that location for regulatory reasons. The deployment policy 220 may detail both the metric-based thresholds that trigger a translation, as well as the target application platform systems associated with each of the triggering events. In other embodiments, a user of the application may explicitly request (e.g., user may prefer a more secure application platform system) a transfer of the application to specific target application platform system.

As part of, or subsequent to, the inspection of a monitored application 156, the broker 116 may store ("2. Store") metadata 158 corresponding to the application 156 and associated application platform system 150 into a configuration repository 210 of the management system 110. Configuration repository 210 may be a data store that may be implemented as a memory (e.g., random access memory), a cache, a drive (e.g., a hard drive), a flash drive, a database system, key/value store, object storage, or another type of component or device capable of storing data. The configuration repository 210 may also include multiple storage components (e.g., multiple drives or multiple databases) that may also span multiple computing devices (e.g., multiple server computers).

As discussed above, metadata 158 may include characteristics and configurations of the AS 154 and of the application 156. For example, metadata 158 may include a description of the application 156, a runtime environment of the application 156, properties used for scaling the application 156 (e.g., size and/or demand thresholds that trigger the addition of resources, such as extra container or nodes, for the application), backup/restore requirements of the AS 154 and of the application 126, the type of code utilized in the application 156, and so on. The metadata 158 is stored in configuration repository 210 and details the configuration information specification to the source application platform system (e.g., configuration information corresponding to a virtualized PaaS 150).

The translation engine 114 may then access and read ("3. Read") the deployment policy 220 from the policy engine 112 to determine the target application platform for purposes of translating the application 156. As illustrated in FIG. 2, the target application platform for application 156 is the virtualized IaaS 130 application platform system for purposes of the following description. Once the target application platform system is determined, the translation engine 114 may then read ("4a. Read") the application metadata 212 corresponding to the source application platform system and translate ("4b. Translate") that metadata into a metadata format 214 for the target application platform system.

In one embodiment, the translation engine 114 utilizes a rules engine, such as translation rules 230, to write out the new metadata file 214 into the configuration repository 210. The translation rules 230 dictate how to convert one type of metadata format (source application platform system format) into a different type of metadata format (target application platform system format). For example, with respect to scalability configurations, the translation rules 230 may include a rule that a scalability, X, on the virtualized PaaS 150 is equal to a scalability Y on the virtualized IaaS 130. Furthermore, if translating an application 156 from the virtualized PaaS 150 to the virtualized IaaS 130, the following translations may also be performed by translation engine 114 utilizing the translation rules 230, for example:

1 HA Proxy in Virtualized PaaS 150=1 LBaaS in Virtualized IaaS 130
1 HTTP container (e.g., resource-constrained processing space of a computing device) in virtualized PaaS 150=1 VM of size small in Virtualized IaaS 130
1 container running a source control repository in virtualized PaaS 150=1 VM of size small with GIT repository in Virtualized IaaS
  IPtables rules in container in virtualized PaaS 150=security group changes in Virtualized IaaS 130
  and so on After the metadata 212, 214 has been translated, the translation engine sends a request ("5. Request") to the broker 116 to deploy the application 158 on the target application platform system (e.g., virtualized IaaS 130) utilizing the application translated metadata 214. The broker 116 accesses and reads ("6. Read") the applications target platform metadata 214 in the configuration repository 210 in order to deploy ("7. Deploy") the application 136 on the target application platform system of the virtualized IaaS 130. The broker 116 may communicate with APIs (e.g., disk APIs of the virtualization software 137) of the virtualized IaaS 130 in order to cause the application 138 to be deployed at the virtualized IaaS 130. In some embodiments, the broker 116 may also integrate with the application platform systems in order to move traffic from the source application platform system (e.g., virtualized PaaS 150) to the target application platform system (e.g., virtualized IaaS 130).

Figure 3:
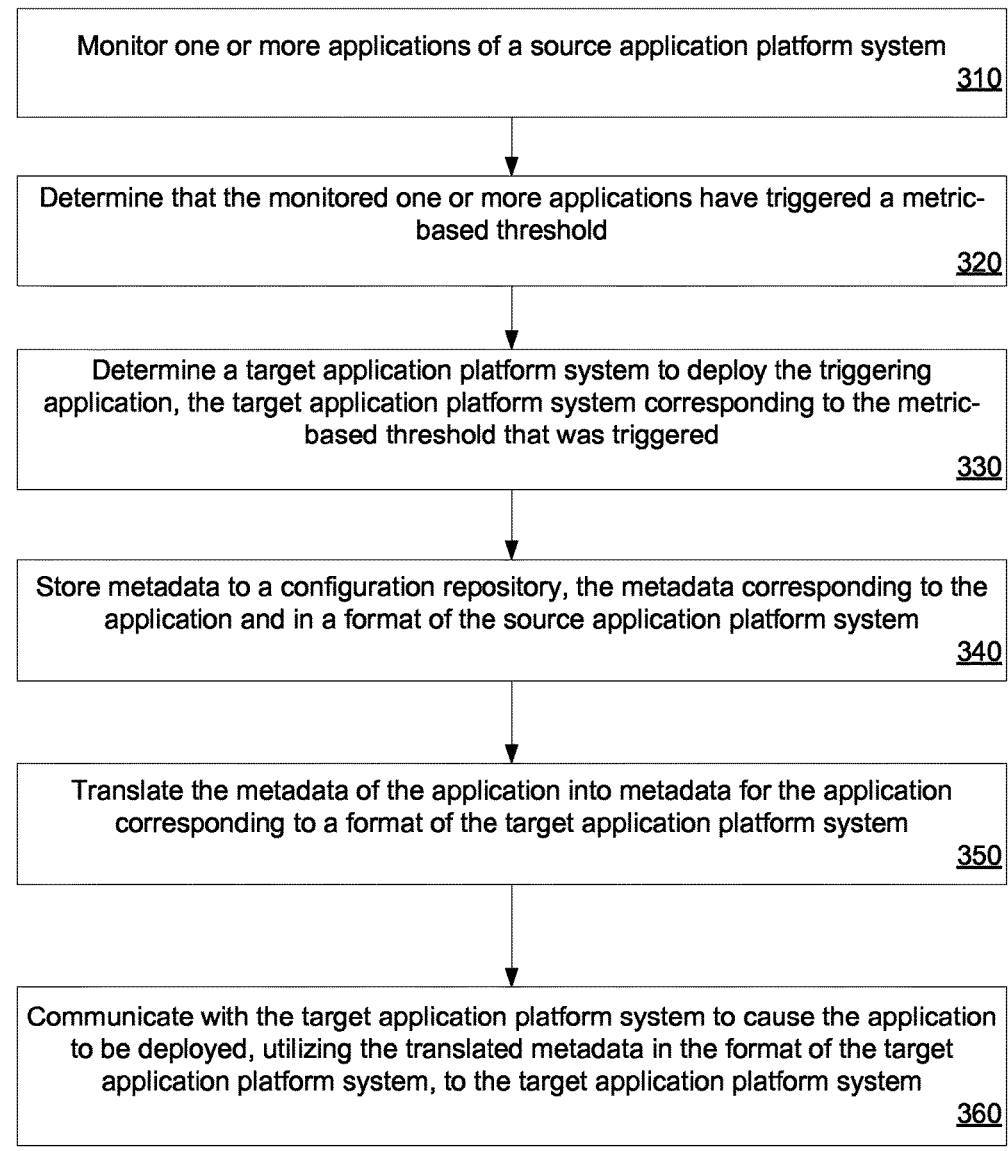
FIG. 3 is a flow diagram illustrating a method for implementing policy-based application deployment and continuous best-fit placement across heterogeneous computing infrastructures, according to an implementation of the disclosure.

FIG. 3 is a flow diagram illustrating a method 300 for implementing policy-based application deployment and continuous best-fit placement across heterogeneous computing infrastructures, according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by management system 110 described with respect to FIGS. 1 and 2.

Method 300 begins at block 310, where one or more applications of a source application platform system are monitored. In some embodiments, the application platform system may include, but is not limited to, a physical machine, a virtualized PaaS, a physical PaaS, or a virtualized IaaS, to name a few examples. Then at block 320, it is determined whether the monitored one or more applications have triggered a metric-based threshold. In one embodiment, the metric-based thresholds may be maintained by a policy engine of the management system, and may include, but are not limited to, performance-based metrics, cost-based metrics, location-based metrics, security-based metrics, and so on. The metric-based thresholds may each correspond to a target application platform system that an application triggering the threshold should be deployed to.

Then, at block 330, a target application platform system is determined which to deploy the application that triggered a metrics-based threshold. As discussed above, the target application platform system may correspond to the particular metrics-based threshold that was triggered by the application. At block 340, the triggering application is inspected and metadata corresponding to the application in a format of the source application platform system is stored to a configuration repository of the management system.

Subsequently, at block 350, the metadata of the application stored in the configuration repository is translated into metadata having a format of the determined target application platform system. In one embodiment, the management system may maintain a translation engine that includes a rules policy to govern the translation of application metadata from one application platform system format to another application platform system format Lastly, at block 360, the management system communicates with the target application platform system to cause the application to be deployed on the target application platform system. In one embodiment, the management system utilizes the translated metadata of the application for the deployment. The management system may include a broker that understands APIs of the target application platform system and can communicate with the target application platform system to cause the application to be deployed on that system. Furthermore, the management system may cooperate with both the source application platform system and the target application platform system to cause traffic corresponding to the application to be migrated to the deployed-version of the application at the target application platform system.

Figure 4:
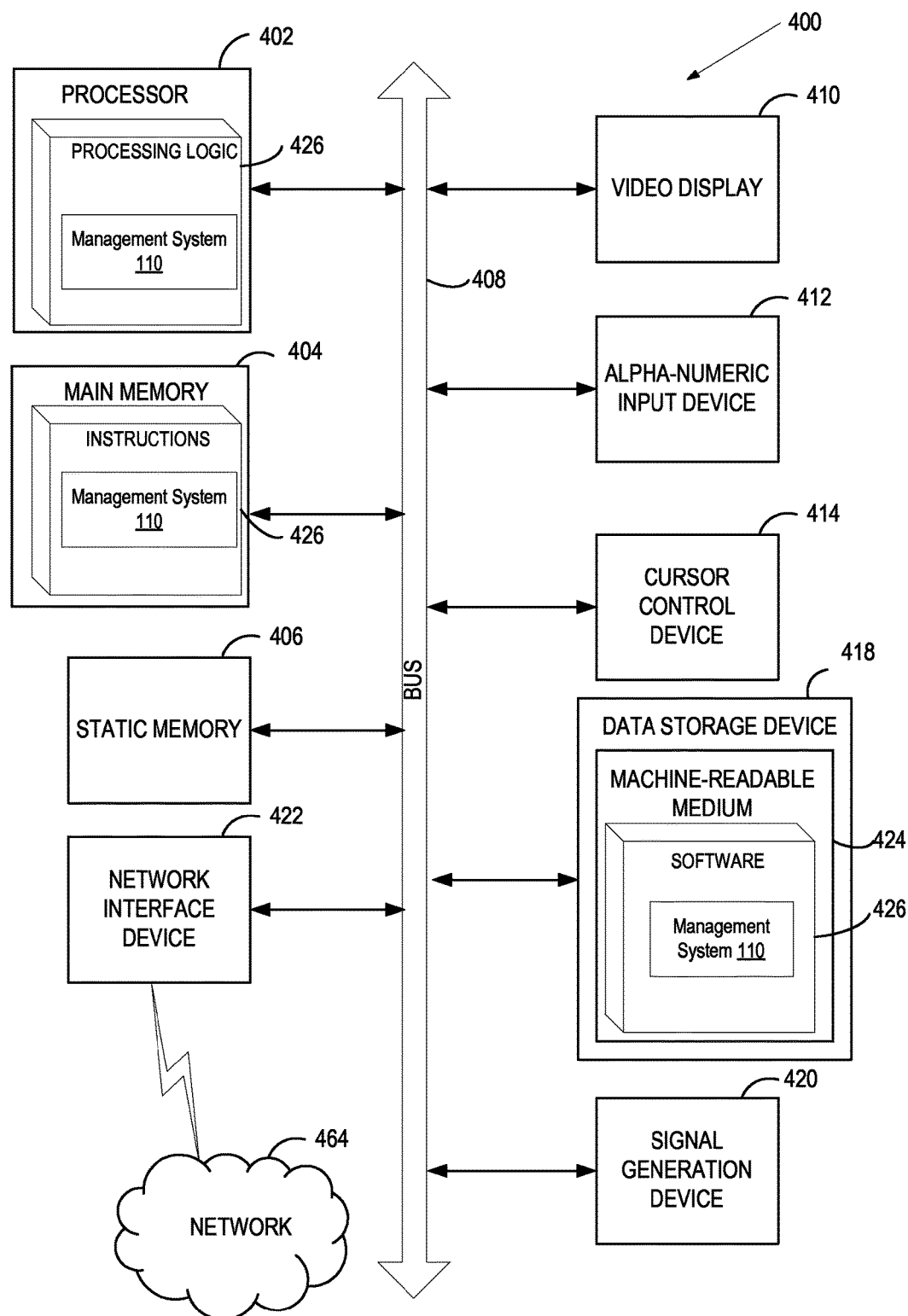
FIG. 4 illustrates a block diagram of one implementation of a computer system.

FIG. 4 illustrates a diagrammatic representation of a machine in the example form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 includes a processing device 402 (e.g., processor, CPU, etc.), a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 408.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 422 communicably coupled to a network 464. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 418 may include a machine-accessible storage medium 424 on which is stored software 426 embodying any one or more of the methodologies of functions described herein. The software 426 may also reside, completely or at least partially, within the main memory 404 as instructions 426 and/or within the processing device 402 as processing logic 426 during execution thereof by the computer system 400; the main memory 404 and the processing device 402 also constituting machine-accessible storage media.

The machine-readable storage medium 424 may also be used to store instructions 426 to implement a management system 110 to implement policy-based application deployment and continuous best-fit placement across heterogeneous computing infrastructures, such as the management system 110 described with respect to FIGS. 1 and 2, and/or a software library containing methods that call the above applications. While the machine-accessible storage medium 424 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "providing", "implementing", "translating", "causing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:
   determining, by a processing device, that an application provided by a source application platform system has triggered a metrics-based threshold of a plurality of metrics-based thresholds by exceeding the metrics-based threshold, wherein the plurality of metrics-based thresholds correspond to a plurality of target application platform systems, and wherein the metrics-based threshold is exceeded when a rate of requests associated with the application exceeds a threshold rate of requests;
   determining, by the processing device, a target application platform system from the plurality of target application platform systems that is selected by using the metrics-based threshold of the plurality of metrics-based thresholds that was triggered, wherein the target application platform system provides different types of resources than the source application platform system providing the application;
   translating, by the processing device, metadata of the application from a format of the source application platform system to a format of the target application platform system;
   determining a resource of the target application platform system to provide the application that corresponds to a resource of the source application platform system that is providing the application; and
   causing, by the processing device, the application to be deployed at the target application platform system in view of the determined resource by using the translated metadata.

2. The method of claim 1, wherein the source application platform system and the target application platform system comprise one of a bare metal system, a virtualized Platform-as-a-System (PaaS), a physical PaaS, or a virtualized Infrastructure-as-a-System (IaaS).

3. The method of claim 1, further comprising monitoring the application at the source application platform system by referencing a policy engine to compare statistics of the application against the plurality of metrics-based thresholds that comprise the policy engine.

4. The method of claim 1, wherein the metrics-based threshold comprises at least one of a performance metric, a cost metric, a location metric, or a security metric.

5. The method of claim 1, wherein each of the plurality of metrics-based thresholds corresponds to one of a plurality of application platform systems comprising at least the source application platform system and the target application platform system.

6. The method of claim 1, wherein the metadata comprises at least one of a runtime environment of the application, properties used for scaling the application, backup requirements of the application, restore requirements of the application, or type of code of the application.

7. The method of claim 1, wherein the translating the metadata utilizes a rules engine to convert fields of the metadata from the format of the source application platform system to the format of the target application system.

8. The method of claim 1, wherein the causing the application to be deployed further comprising communicating with one or more application programming interfaces (APIs) of the target application platform to provide the metadata in the format of the target application platform system.

9. A system comprising:
a memory; and
a processing device, operatively coupled with the memory, to:
determine that an application provided by a source application platform system has triggered a metrics-based threshold of a plurality of metrics-based thresholds by exceeding the metrics-based threshold, wherein the plurality of metrics-based thresholds correspond to a plurality of target application platform systems, and wherein the metrics-based threshold is exceeded when a rate of requests associated with the application exceeds a threshold rate of requests;
determine a target application platform system from the plurality of target application platform systems that is selected by using the metrics-based threshold of the plurality of metrics-based thresholds that was triggered, wherein the target application platform system provides different types of resources than the source application platform system providing the application;
translate metadata of the application from a format of the source application platform system to a format of the target application platform system;
determine a resource of the target application platform system to provide the application that corresponds to a resource of the source application platform system that is providing the application; and
cause the application to be deployed at the target application platform system in view of the determined resource by using the translated metadata.

10. The system of claim 9, wherein the source application platform system and the target application platform system comprise one of a bare metal system, a virtualized Platform-as-a-System (PaaS), a physical PaaS, or a virtualized Infrastructure-as-a-System (IaaS).

11. The system of claim 9, wherein processing device is further to monitor the application at the source application platform system by referencing a policy engine to compare statistics of the application against the plurality of metrics-based thresholds that comprise the policy engine.

12. The system of claim 9, wherein the metrics-based threshold comprises at least one of a performance metric, a cost metric, a location metric, or a security metric, and wherein each of the plurality of metrics-based thresholds corresponds to one of a plurality of application platform systems comprising at least the source application platform system and the target application platform system.

13. The system of claim 9, wherein the metadata comprises at least one of a runtime environment of the application, properties used for scaling the application, backup requirements of the application, restore requirements of the application, or type of code of the application.

14. The system of claim 9, wherein the translating the metadata utilizes a rules engine to convert fields of the metadata from the format of the source application platform system to the format of the target application system.

15. The system of claim 9, wherein the causing the application to be deployed further comprising communicating with one or more application programming interfaces (APIs) of the target application platform to provide the metadata in the format of the target application platform system.

16. A non-transitory machine-readable storage medium comprising instructions that, when executed by a processing device, cause the processing device to:
determine, by the processing device, that an application provided by a source application platform system has triggered a metrics-based threshold of a plurality of metrics-based thresholds by exceeding the metrics-based threshold, wherein the plurality of metrics-based thresholds correspond to a plurality of target application platform systems, and wherein the metrics-based threshold is exceeded when a rate of requests associated with the application exceeds a threshold rate of requests;
determine, by the processing device, a target application platform system from the plurality of target application platform systems that is selected by using the metrics-based threshold of the plurality of metrics-based thresholds that was triggered, wherein the target application platform system provides different types of resources than the source application platform system providing the application;
translate, by the processing device, metadata of the application from a format of the source application platform system to a format of the target application platform system;
determine, by the processing device, a resource of the target application platform system to provide the application that corresponds to a resource of the source application platform system that is providing the application; and
cause, by the processing device, the application to be deployed at the target application platform system in view of the determined resource by using the translated metadata.

17. The non-transitory machine-readable storage medium of claim 16, wherein the source application platform system and the target application platform system comprise one of a bare metal system, a virtualized Platform-as-a-System (PaaS), a physical PaaS, or a virtualized Infrastructure-as-a-System (IaaS).

18. The non-transitory machine-readable storage medium of claim 16, comprising further instructions that, when executed by the processing device, cause the processing device to monitor the application at the source application platform system by referencing a policy engine to compare statistics of the application against the plurality of metrics-based thresholds that comprise the policy engine.

19. The non-transitory machine-readable storage medium of claim 16, wherein the metrics-based threshold comprises at least one of a performance metric, a cost metric, a location metric, or a security metric, and wherein each of the plurality of metrics-based thresholds corresponds to one of a plurality of application platform systems comprising at least the source application platform system and the target application platform system.

20. The non-transitory machine-readable storage medium of claim 16, wherein the metadata comprises at least one of a runtime environment of the application, properties used for scaling the application, backup requirements of the application, restore requirements of the application, or type of code of the application.

\* \* \* \* \*